W. T. KOSINSKI.
Brake for Land Conveyance.
No. 108,366.
Patented Oct. 18, 1870.
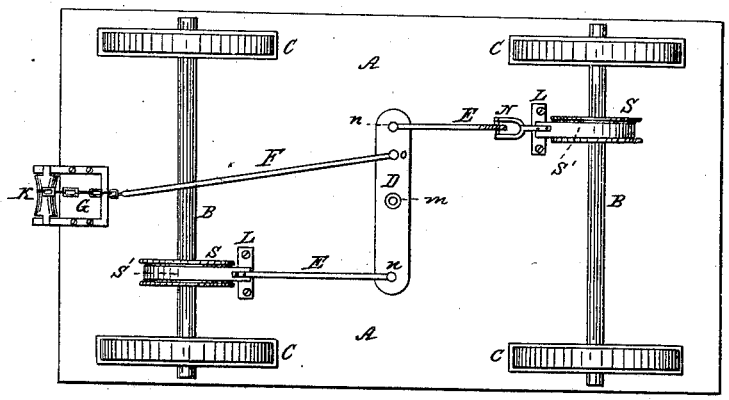
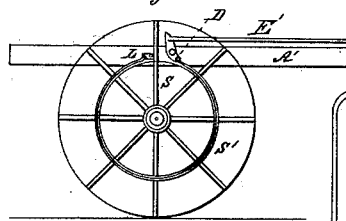
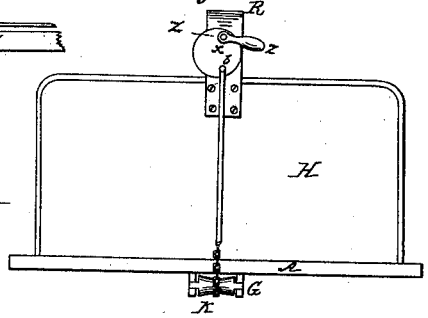
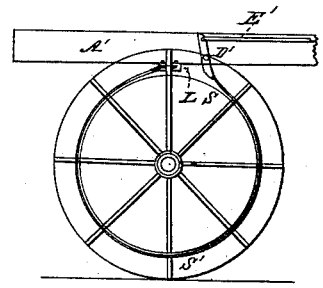
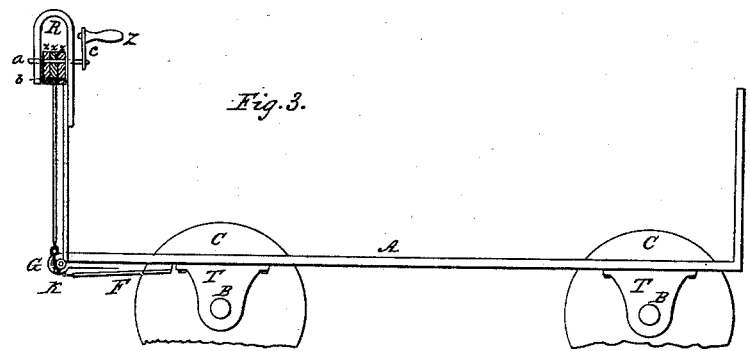
Witnesses:
Chas. F. Barton
F. S. Miller
Inventor:
Wladyslaw T. Kosinski

UNITED STATES PATENT OFFICE.

WLADYSLAW THEODORE KOSINSKI, OF PHILADELPHIA, PENNSYLVANIA.

IMPROVEMENT IN BRAKES FOR LAND CONVEYANCES.

Specification forming part of Letters Patent No. 108,366, dated October 18, 1870.

*To all whom it may concern:*

Be it known that I, WLAD. T. KOSINSKI, of Philadelphia, county of Philadelphia, State of Pennsylvania, have invented certain Improvements in Brakes for Vehicles, Stage-Coaches, and Street and other Cars, of which the following is a specification.

The nature of my invention consists in the improvement by means of which the brake is applied to the whole of the circumference of the axle when revolving, or upon the hub in stationary axle, also in the mode of operating the brake, which I do by means of an eccentric.

Figure 1 represents the brake secured upon the lower part of the bed of the vehicle. Fig. 2 represents front view of the operating mechanism. Fig. 3 represents side view of the operating mechanism. Figs. 4 and 5 are modifications in the mode of attaching the brakes to the beams.

A is the bottom of the vehicle or truck, resting upon the axle-bearings. B B are the axles. S S are the two brake-wheels upon the axles. D is the lever pivoted to the bottom of the truck, and L L are brackets secured in front of the friction-wheels. The friction spring-shoe S' S' is secured at one end to said brackets L, and the other end is secured to the connecting-rods E E. These rods are at their other ends connected with the lever D. Between the pivot of the lever D and the extreme connection of the connecting-rod another perforation is made, into which the rod F, which connects the brake apparatus with the operating mechanism, is connected, which will hereinafter be described. This mode of operating brakes is applicable to vehicles in which the axles revolve. In vehicles where the wheels revolve and the axle is stationary I secure the spring-brake upon the hub.

In order to avoid friction, I line the brake-shoe with anti-friction material.

I do not confine myself to the particular manner of connecting the brake-shoe to the carriage or car, as this will depend on the construction of the vehicle.

In both Figs. 4 and 5 one end of the brake-shoe S' S' and lever D' are secured to the beam under the body of the vehicle, and the brake-shoe is applied around the friction-wheel S, secured to the main wheel.

The rods F E E' have guide or adjusting screws N attached to them, for the proper adjustment of the shoes, in order to make them effective.

The operating mechanism upon the dash-board consists of an outwardly-curved bracket secured at its lower part to the dash-board. Between this bracket are two disks, x x, with the disk and rod y eccentrically attached by means of a pin, b, passing through all the disks. These disks are secured within the bracket by a pin or shaft, a, passing eccentrically through the disks and through the bracket, to the end of which shaft a crank, c z, is attached.

Upon the front of the truck, and immediately beneath the operating mechanism, I attach a roller, k, around which passes the chain that connects the eccentric-rod and the rod connected with lever D.

The advantages in this device are, first, the speed with which the brake is applied; second, the brake being applied around the whole of the periphery of the wheel, it is therefore more powerful; third, the simplicity of the mechanism.

What I claim is—

1. The arrangement of the disk-rod y, pivoted between the disks z z eccentrically at b, and the disks z z y, also pivoted eccentrically to the bracket R by means of a bolt passing through the disks and brackets, the bolt being provided with a crank, c z.

2. The arrangement of the brake-shoes applied circumferentially upon the axles or hubs by means of lever D, spring brake-shoes secured at one end to the brackets L, and on the other to the connecting-rods F E E', and the latter and the chain connect the brake and operating mechanism, substantially as described.

3. The mode of connecting the brake-shoe and lever to the beams running under the body of the vehicle, said brakes to be applied either to axle-hubs or additional friction-wheels upon the main wheels, and operated by the eccentric, substantially as described.

WLADYSLAW THEODORE KOSINSKI.

Witnesses:
JOSEPH PAUDLER,
V. MURPHY.